Dec. 17, 1929.  E. ABORN  1,740,136
COFFEEPOT
Filed May 22, 1929
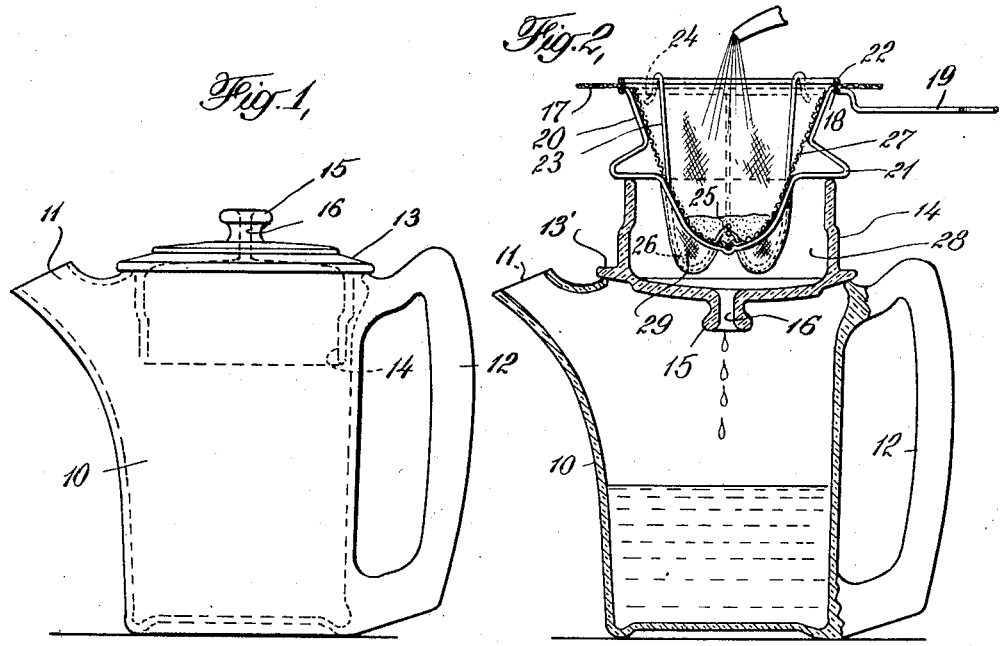
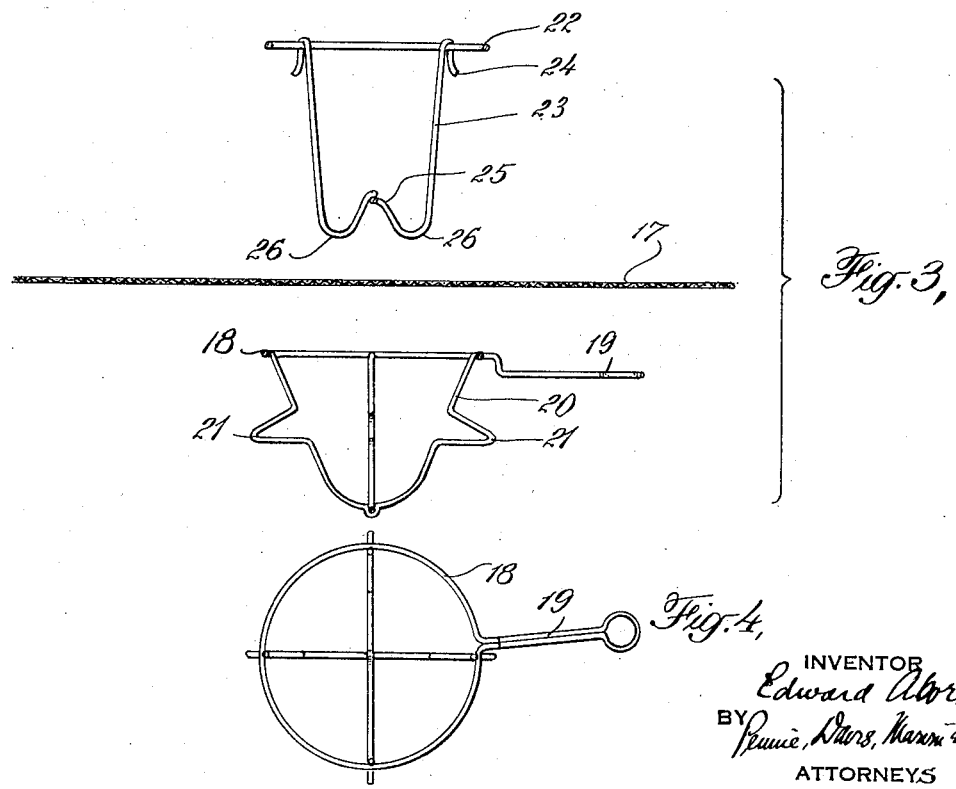
INVENTOR
Edward Aborn
BY
ATTORNEYS Patented Dec. 17, 1929

1,740,136

UNITED STATES PATENT OFFICE

EDWARD ABORN, OF EAST ORANGE, NEW JERSEY

COFFEEPOT

Application filed May 22, 1929. Serial No. 364,994.

This invention relates to coffee pots and is concerned more particularly with a filter coffee pot of novel construction which is especially adapted for use in making coffee by the filtration or drip process. The coffee pot of this invention is an improvement on that described and claimed in my Patent No. 1,440,047, issued December 26, 1922, in the respect that it is made of fewer parts, is somewhat easier to use, and produces a beverage of equal excellence.

The coffee pot of the patent consists of a pot body, a cover, a filter frame with a cloth forming a bag for the coffee grounds, and a ring-like support placed between the body and cover and holding and concealing the filter frame and bag when the pot is in use. The improved construction includes a pot body, a filter frame, and a cover of special construction so formed that it may be placed inverted on the top of the body and in that position serves as a support for the frame and bag during the filtration operation, and also serves as a cover which encloses the brewed coffee in the pot during the brewing process. While thus supported, the bag is far removed from the liquid which has passed through it and into the pot so that there is no possibility of the liquid leaching the grounds and thus extracting substances therefrom which impair the flavor of the liquid. The boiling water used is poured into the bag, flows through the grounds and then passes through an opening in the cover into the body of the pot. Since the cover when inverted closes the upper end of the pot, the aroma of the brewed coffee is protected from air by the cover during the brewing operation and the temperature of the coffee is retained. When the desired quantity of the beverage has been made, the frame with the bag in place, is removed from the cover and the latter placed in normal upright position. When the cover is in that position, the pot is of ordinary appearance.

In addition to the features above described, the invention includes a filter frame of improved construction which is simple and inexpensive and easily assembled and taken apart.

For a better understanding of the invention, reference may be had to the accompanying drawing, in which Fig. 1 is a view of the new coffee pot in side elevation with the cover in normal position;

Fig. 2 is a view of the new pot partly in section showing the use of the device in the making of the coffee beverage;

Fig. 3 is a sectional view of the filter frame taken apart, and

Fig. 4 is a plan view of the outer member of the frame.

Referring now to the drawing, the new coffee pot includes the usual pot body 10 preferably of china and having a spout 11 and a handle 12. The top of the body has an opening which is closed by a cover 13 loosely mounted in place. This cover has a skirt 14 formed on its under surface which projects downwardly into the pot a substantial distance when the cover is in normal position. The skirt is of less diameter than the cover so that the latter has a projecting rim 13' on which it may be supported on the top body either in normal upright position (Fig. 1) or inverted (Fig. 2). The top of the cover has the usual knob 15 and a passage 16 through the cover extends through this knob.

The filter frame is preferably made of wire and it consists of two parts, between which the disc 17 of filter cloth is placed. The outer part comprises a ring 18 made of a single piece of wire, the ends of which are welded together. This wire is formed to provide a handle portion 19 projecting outwardly from the ring a substantial distance. Mounted on the ring are frame members 20 of U-shape. Each member is formed with a projecting loop 21 in each leg thereof and the two members cross each other at right angles. The loops provide a means for supporting the frame in position.

The inner part of the frame consists of a wire ring 22, on which are mounted U-shaped frame members 23. Each member is hooked over the ring, the ends 24 of the members providing a means for supporting this part of the frame in the outer part previously described. The hook ends 24 also serve as a means for clamping the cloth between the two parts of the frame. Each U-shaped member 23 is provided with an upward bend 25 midway between its ends, the depressed portions 26 on either side of the bend serving the purpose of forming the cloth into a bag having four depending points at which dripping may occur.

In assembling the frame, the cloth 17 is placed in position over the top of the outer part of the frame and then the inner part is introduced into the lower part, shaping and clamping in the cloth to provide the bag 27 (Fig. 2). The projecting loops 21 on the lower frame member extend sufficiently far so that the distance between a pair of opposite loops is greater than the diameter of the skirt 14 of the cover.

In making coffee with the new pot, the filter frame is assembled to form the bag and a quantity of ground coffee placed in the bag. The cover of the pot is then inverted and placed on top of the pot in the position illustrated in Fig. 2, and the filter frame placed so that the loops 21 rest on the edges of the skirt 14. The inverted cover, in addition to performing its ordinary function as a cover, provides a chamber 28 in which the end of the bag lies, this chamber communicating with the body of the pot through the passage 16. Boiling water is now poured into the interior of the bag, passes through the grounds and drips from the points 29 formed by the portions 26 of the inner frame member. The drip coffee thus produced flows through the passage 16 into the interior of the pot. The inverted cover protects the brewed coffee during the brewing operation, preserving the aroma and retaining the temperature.

It will be seen that in the filtration operation the boiling water comes in contact with the coffee grounds only once and the pot may be practically filled with coffee without danger of the liquid coming in contact again with the grounds and thus extracting from them any undesirable substances which impair the flavor of the beverage. Also, the coffee is brewed into a closed vessel not open at the top during the brewing operation.

When the desired quantity of water has passed through the bag, the filter frame is removed and the cover restored to its normal position. The pot then has the usual appearance of the ordinary coffee pot and coffee is poured therefrom in the usual way.

The new pot consequently consists only of three parts, a pot body, a cover, and a filter frame, and as this frame is suitably supported when it rests on the skirt of the cover when inverted, it is not necessary to employ a separate ring or support for the frame. The frame and bag are used only during the coffee-making operation and when that is completed, the frame is removed, the cover restored to normal position, and the pot used in the ordinary manner.

What I claim is:

1. The combination of a pot body, a cover therefor having an opening from top to bottom and a skirt depending from its under surface, said cover being adapted to rest on top of the pot body in normal upright position with the skirt entering the pot body and also being adapted to be placed on the top of the pot body in inverted position with the skirt projecting upwardly, and a filter frame including a coffee bag adapted to be mounted on the cover with said bag entering the chamber defined by the cover and skirt.

2. The combination of a pot body, a cover therefor having an opening from top to bottom and a skirt depending from its under surface, the cover having a rim projecting beyond the skirt on which the cover may be supported on the pot body with the skirt entering the body, the cover also being adapted to be supported in inverted position on the top of the body with the skirt and cover together forming a chamber, and a filter frame with a bag for coffee grounds adapted to be supported on the edge of the skirt with the bag entering said chamber.

3. The combination of a pot body having a spout opening into the body above the normal level of the liquid therein, said body having an opening at the top, a cover for the opening having a skirt of less diameter than the opening extending from one surface of the cover, the cover being supported on the body to close the opening and with said skirt extending upwardly and forming, with the remainder of the cover, a chamber in communication with the interior of the body through a passage through the cover, and a filter member including a bag for coffee grounds mounted on said cover with said bag entering said chamber, said cover being adapted on removal of said filter member to be inverted to close said opening with the skirt entering the opening.

In testimony whereof I affix my signature.

EDWARD ABORN.